US011919744B2

(12) United States Patent
Trottmann

(10) Patent No.: US 11,919,744 B2
(45) Date of Patent: Mar. 5, 2024

(54) ELEVATOR SYSTEM HAVING A CAR APRON SUPPORTABLE ON GUIDE RAILS

(71) Applicant: Inventio AG, Hergiswil (CH)

(72) Inventor: Gilles Trottmann, Immensee (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 17/596,836

(22) PCT Filed: Jun. 15, 2020

(86) PCT No.: PCT/EP2020/066441
§ 371 (c)(1),
(2) Date: Dec. 20, 2021

(87) PCT Pub. No.: WO2020/260046
PCT Pub. Date: Dec. 30, 2020

(65) Prior Publication Data

US 2022/0315388 A1 Oct. 6, 2022

(30) Foreign Application Priority Data

Jun. 28, 2019 (EP) ..................................... 19183373

(51) Int. Cl.
*B66B 13/28* (2006.01)

(52) U.S. Cl.
CPC .................................. *B66B 13/285* (2013.01)

(58) Field of Classification Search
CPC .................................................... B66B 13/285
See application file for complete search history.

(56) References Cited

U.S. PATENT DOCUMENTS

| | | | | |
|---|---|---|---|---|
| 1,004,744 | A | 10/1911 | Coffey | |
| 1,022,972 | A | 4/1912 | Ross | |
| 1,051,945 | A | 2/1913 | Baumann et al. | |
| 4,793,441 | A | 12/1988 | Cilderman et al. | |
| 2011/0240413 | A1* | 10/2011 | Madar | B66B 5/0056 187/343 |
| 2020/0031628 | A1* | 1/2020 | Fonteneau | B66B 11/0226 |

FOREIGN PATENT DOCUMENTS

| | | | | | |
|---|---|---|---|---|---|
| CH | 431864 | A | | 3/1967 | |
| CN | 103889875 | A | | 6/2014 | |
| DE | 10065101 | A1 | * | 7/2002 | B66B 13/285 |
| DE | 202006016013 | U1 | * | 3/2007 | B66B 13/285 |
| EP | 118576 | A2 | | 7/2001 | |
| EP | 2042463 | A1 | | 4/2009 | |
| EP | 2138443 | A1 | * | 12/2009 | B66B 13/285 |
| EP | 3656720 | A1 | * | 5/2020 | B66B 11/0226 |
| FI | 117627 | B | * | 12/2006 | B66B 13/28 |
| FI | 118047 | B | * | 6/2007 | B66B 13/28 |

(Continued)

*Primary Examiner* — Minh Truong
(74) *Attorney, Agent, or Firm* — William J. Clemens; Shumaker, Loop & Kendrick, LLP

(57) ABSTRACT

An elevator system includes a car that can be moved along guide rails in an elevator shaft and a car apron attached to the car. The car apron is supported on the guide rails. The car apron is collapsible with two flat apron elements hinged together at a horizontal fold line. For the support, the car apron has a support structure that adjoins a lower end of the lower flat apron element and includes guide elements that engage the guide rails.

14 Claims, 4 Drawing Sheets

(56) References Cited

FOREIGN PATENT DOCUMENTS

| | | | | |
|---|---|---|---|---|
| FR | 2912390 | A1 * | 8/2008 | ........... B66B 13/285 |
| JP | H05147845 | A | 6/1993 | |
| JP | 08319070 | A * | 12/1996 | ........... B66B 13/285 |
| JP | 2005104649 | A | 4/2005 | |
| JP | 2005298141 | A | 10/2005 | |
| JP | 2009155096 | A | 7/2009 | |
| WO | 2008110696 | A1 | 9/2008 | |
| WO | 2012127269 | A1 | 9/2012 | |

* cited by examiner

ELEVATOR SYSTEM HAVING A CAR APRON SUPPORTABLE ON GUIDE RAILS

FIELD

The invention relates to an elevator system having a car movable along guide rails, the car having an apron supportable on the guide rails.

BACKGROUND

Elevator systems for conveying people and goods contain cars that can be moved upward and downward in an elevator shaft. The cars can be moved by means of a drive unit using suspension means, for example in the form of suspension cables or suspension belts. As a result of malfunctions or emergency stops, the car may become stuck between the floors. In such incidents, the trapped people must be evacuated from the car to the next stop. In this case, a gap could arise between the underside of the car and the floor, and people could fall through this gap during the evacuation into the shaft. In order to avoid such incidents, the cars are equipped with car aprons. There are various sets of rules with precise specifications for the design of car aprons for the elevator industry. Rigid car aprons have been known and used for a long time. European standard EN 81-20:2014 stipulates in section 5.4.5 that the vertical length of the apron must be at least 750 mm and that the apron must be designed to be so stable that there is virtually no yielding in the case of a force of 300 N applied at a point.

For some time now, elevator systems with reduced shaft pit depths have become increasingly popular. In order to allow the shaft pit depth to be reduced, the car aprons are designed to be movable. For example, telescopic car aprons, such as those shown in EP 2 042 463 A1, are known. The car aprons can also be designed to be foldable. Such a car apron is known from CH 431 864 A, for example. Pivotable and foldable car aprons are also known from EP 1 118 576 A2. In practice, it has been shown that the high requirements in terms of stability are difficult to achieve with the known car aprons, or can be achieved only with great effort.

SUMMARY

It is therefore an object of the present invention to avoid the disadvantages of the known elevator system and in particular to provide an elevator system with which the evacuation of people from the car can be ensured in a simple and safe manner. In particular, the car apron used for this purpose should meet high stability requirements.

According to the invention, this object is achieved by an elevator system having an elevator shaft and a car that can be moved up and down in the elevator shaft along guide rails. The car also has a car apron. The fact that the car apron is or can be supported on the guide rails results in several advantages. The car apron is characterized by a high level of stability. By virtue of the support, it is ensured that undesired yielding into the shaft interior can be easily prevented by the floor-side action on the car apron, for example if a person presses against the apron as a result of falling during an evacuation of people from the car. In particular, the arrangement makes it possible, in a reliable manner, for even strict standard requirements to be easily met. Elaborate, complex and costly structural measures for the stable and rigid attachment of the car apron to the car can be dispensed with.

Two guide rails for guiding the car can be provided in the elevator shaft. The guide rails can preferably be arranged opposite one another on corresponding shaft walls of the elevator shaft. The guide rail can be a conventional car guide rail. T-shaped metal profiles are often used for such car guide rails.

The car guide rails can have guide surfaces along which a car guide shoe can be moved for guiding the elevator car. The car apron is advantageously supported on the guide rails in such a way that the car apron makes contact with at least one of the guide surfaces of the car guide rail. The guide surfaces can be associated with a rail web of the T-shaped guide rail. Instead of T-shaped metal profiles, however, other guide rails are also conceivable for the elevator system with the car apron that is operatively connected to the guide rails.

The present elevator system is characterized, among other things, by the fact that the guide rails already mounted in the elevator shaft can be used to support the car apron, which guide rails extend substantially over the entire height of the elevator shaft. No complex, additional support devices are necessary.

Instead of the two guide rails being arranged on opposite shaft walls of the elevator shaft, the guide rails can also be positioned differently in the shaft. For example, the guide rails could be attached to the shaft wall that is opposite the shaft wall which is on the shaft-door side. Thus, the arrangement with the car apron could also be used in elevator systems with cars in a backpack design. It is also conceivable for the guide rails to be attached to the shaft wall which is on the shaft-door side.

The guide rail can also be designed as a hollow profile, for example. The guide rail could, for example, be a guide arrangement consisting of a rolled profile with locally separated braking and guide portions in the manner of WO 2016/078726 A1. The guide rail can then also be designed in such a way that it can be used to guide both the car and a counterweight which is connected to the car via suspension means and can be moved in the opposite direction to the car.

Shaft doors can be provided on each floor in order to allow passengers and goods access to the car. The car can have a car door. The car can have a front side, a rear side opposite the front side and a parallel car side connecting the front side and rear side. As a rule, the car door and thus also the car apron are arranged in the region of the front side. The guide rails for guiding the car can be attached to shaft walls which are adjacent to the above-mentioned two parallel car sides. The guide rails can be positioned in the shaft in such a way that, in a top view, they lie approximately in the center of these car sides.

The car apron can be designed to be static. A rigid car apron is comparatively simple and inexpensive to produce and is particularly suitable for elevator systems with sufficiently deep shaft pits.

However, for certain application purposes and in particular for elevator systems with shallow pit depths or for elevator systems without a pit, it is advantageous if the car apron is designed to be movable. Particularly preferably, the car apron is designed to be movable in such a way that a gap between the car and a floor can be blocked by moving the car apron toward the shaft pit. The car apron can be moved downward from a rest position close to the car floor or on the car underside into a blocking position for blocking the gap between the car and the evacuation floor.

The car apron, which is preferably movable between a rest position and a blocking position, is particularly suitable for elevator systems with shaft pits having shallow pit depths or for elevator systems without a pit. The car apron can be supported on the guide rails both in the rest position and in the blocking position. Instead of a permanent operative connection between the car apron and guide rails, it would also be conceivable to design the car apron in such a way that the car apron is only temporarily supported on the guide rails in specific operating phases and that the car apron does not act on the guide rails during normal operation.

The rest position corresponds to a position for normal operation, in which position the car apron is positioned close to a car underside. In this rest position, there would be a gap between the car and the floor if the car were to become stuck between the floors. This gap must be closed in order to safely evacuate the trapped people from the car. To do this, the car apron is moved down into the blocking position. The blocking position is the position for closing the gap between the floor and the underside of the car, thus preventing people from falling from the floor into the elevator shaft via an open shaft door.

The movement of the car apron from the rest position into the blocking position can be a pivoting movement, for example. Other types of movement are of course also conceivable through a corresponding mechanical design. For example, the car apron can be designed to be telescopic. The car apron could also be designed to extend in the vertical direction as a whole. The movement of the car apron to provide the blocking position would in this case be a vertical extension movement. It would also be conceivable to design the car apron so that it can be rolled out.

It can be particularly advantageous if the car apron is a foldable or collapsible car apron with preferably at least one flat apron element. The car apron or the at least one flat apron element of the car apron can be oriented approximately horizontally in the rest position and rest against the underside of the car or be attached close to it. In the blocking position, the car apron or its apron elements can be oriented vertically or extend in parallel with the shaft wall which is on the shaft-door side. In an advantageous embodiment, the collapsible car apron can have two flat apron elements hinged together via a horizontal fold line.

In the region of a car door sill, the car apron can have at least one flat upper apron element which is hinged to the car at an upper end about a horizontal pivot axis. The second apron element adjoins the upper apron element via the fold line. The fold line can be formed by a hinge or another joint that can rotate about a horizontal axis.

Locking means can be provided to secure the completely unfolded car apron, i.e. when the car apron is in the blocking position. Such locking means could also be used for other movable car aprons.

The locking means can comprise at least one pivotable bolt part which engages in a bolt receiving part when the car apron is completely unfolded. Two or more pivotable bolt parts which can engage in associated bolt receiving parts can also be provided to secure the completely unfolded car apron.

In order to support the car apron on the guide rails, the car apron can comprise at least one guide element which can be guided along one of the guide rails. The guide element can be guided along the guide rail in a sliding manner or by means of rollers. However, the guide element does not have to contact the guide rail continuously when the car is traveling. It may well be sufficient if actual contact occurs only in an emergency, for example when a person presses against the apron during an evacuation.

The car apron can have two mutually opposing guide elements, with each guide element being associated with a guide rail and being operatively connected thereto.

For a reliable operative connection between the car apron and the guide rail, it can be advantageous if the relevant guide element has a cutout which surrounds a web-like guide portion of the associated guide rail. The web-like guide portion can be the rail web of a T-shaped profile for the guide rail, for example. The guide element accordingly has a guide cutout for forming a female guide means which surrounds the web-like guide portion which forms a male guide means complementary to the female guide means. Alternatively, a reverse arrangement in which the female and male guide means are interchanged in the car apron and guide rail would also be conceivable.

The at least one guide element can be part of a support structure for providing the support arrangement for supporting the car apron on the guide rails. The support structure can adjoin a lower end of a flat apron element and form the floor-side terminations of the car apron. If, as mentioned above, the car apron has two flat apron elements hinged together via a horizontal fold line, the support structure can adjoin the lower end of the lower apron element. The support structure with the at least one guide element interacting with one of the guide rails results in a particularly stable arrangement.

The support structure can also have a preferably horizontal support frame. The preferably rectangular support frame can comprise front, rear and side frame parts which form a closed frame. A flat apron element can be attached at least to the front frame part.

The car apron can comprise controllable or manually operable securing means, with the aid of which the car apron is docked to the car in the rest position. In the rest position, the support frame can be attached directly to the car floor. The car apron can also be designed in such a way that, after it has been enabled or released by appropriate control or operation of the securing means, the car apron can be moved into the blocking position by the force of gravity.

In particular for cars with two car doors, it can be advantageous if foldable or collapsible partial car aprons are provided on a front side of the car and on a rear side of the car opposite the front side, and are mechanically coupled to one another for simultaneous unfolding or collapsing. Such a mechanical coupling can easily be obtained by using the aforementioned support frame.

Another aspect of the invention relates to a car apron for a car of the elevator system described above that can be moved along guide rails. The car apron has a support arrangement by means of which the car apron can be supported on the guide rails.

DESCRIPTION OF THE DRAWINGS

Further individual features and advantages of the invention can be found in the following description of embodiments and in the drawings, in which.

DETAILED DESCRIPTION

Figure 1:
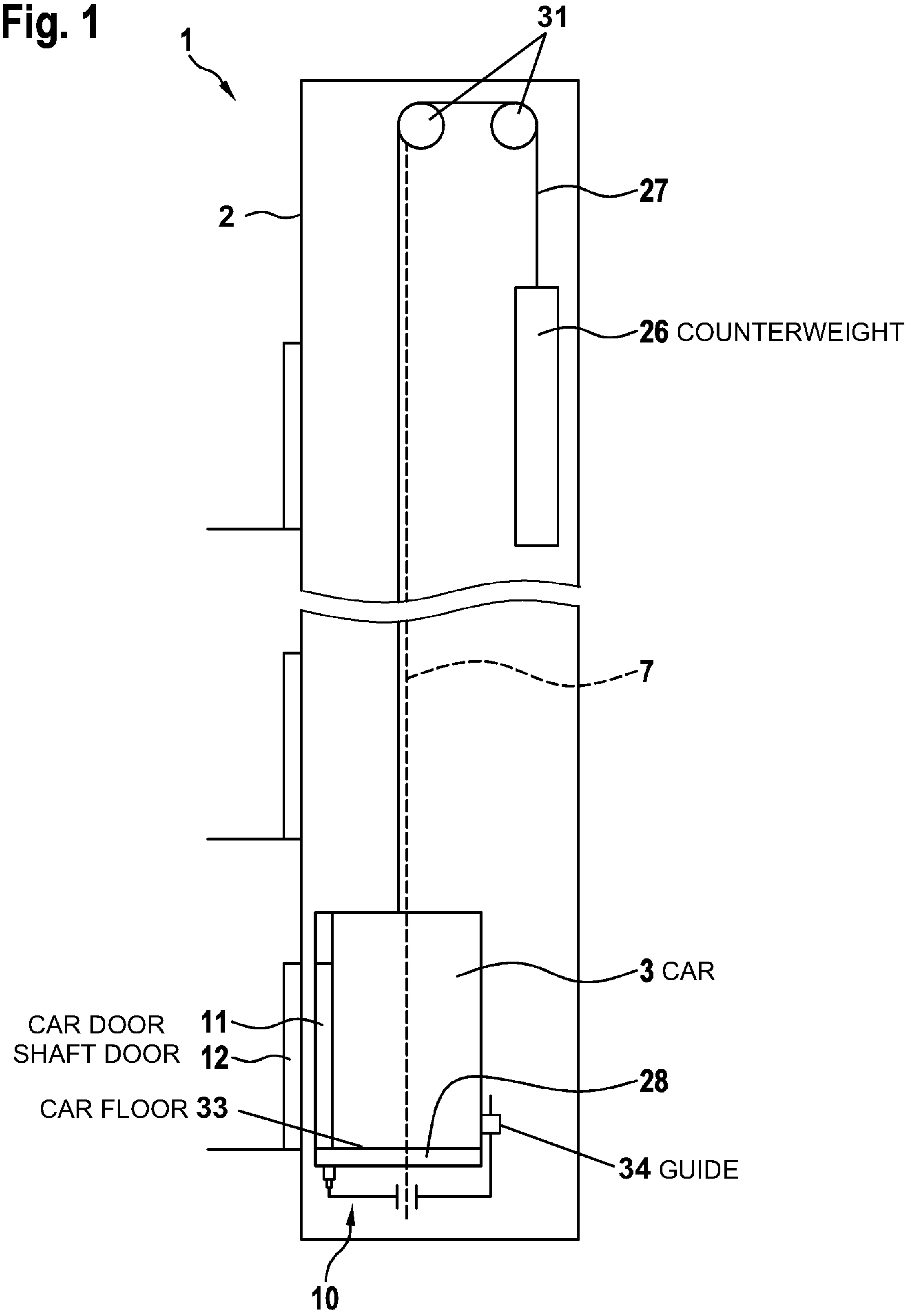
FIG. 1 is a greatly simplified and schematic view of an elevator system according to the invention with a car that can be moved up and down in an elevator shaft and is equipped with a car apron.

FIG. 1 shows an elevator system, denoted by 1, for a multi-story building. The building has one elevator shaft 2 or multiple elevator shafts as required. The elevator system 1 shown here contains a car 3 that can be moved vertically up and down in the elevator shaft 2 for the transport of people or goods to individual floors. A shaft door 12 is assigned to each floor. The car has a car door 11 adapted to the shaft doors 12. In addition to the car 3, the elevator system has a counterweight 26 and suspension means 27 as well as a drive (not shown). The drive (e.g. a traction sheave drive) drives the one or more suspensions means 27 (for example belts, steel cables) via one of the rollers 31 and thus moves the car 3 and the counterweight 26 in opposite directions.

Figure 4:
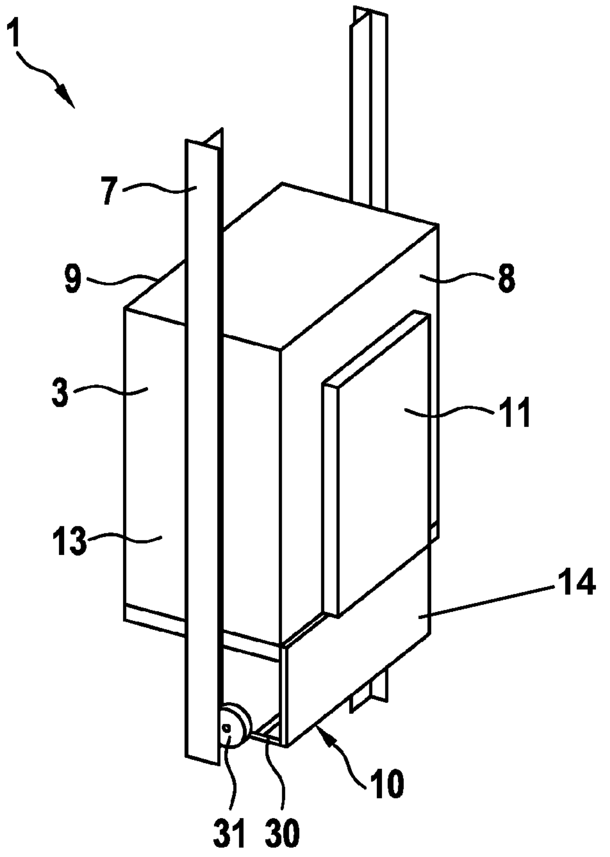
FIG. 4 is a simplified perspective view of a car for an alternative elevator system, in which the car has a rigid car apron which is supported on guide rails.

The car 3, as shown in FIG. 4, which comprises a generally cuboid car body, has a front side 8, a rear side 9 opposite the front side, and parallel car sides 13 connecting the front side and rear side. A car floor is designated by 33 as shown in FIG. 1.

To guide the car 3, guide rails 7 indicated by a dashed line are arranged in the elevator shaft 2. The counterweight guide rails and other components of the elevator system 1 have not been shown for reasons of clarity.

A special car apron 10, which is described in detail below, is arranged below the car 3. In FIG. 1, the car apron 10 is in a rest position close to the car 3, and the car apron is normally located in this position. The car apron 10 is brought into a blocking position only in special situations, for example for emergency evacuations of people from the car 3.

Figure 2:
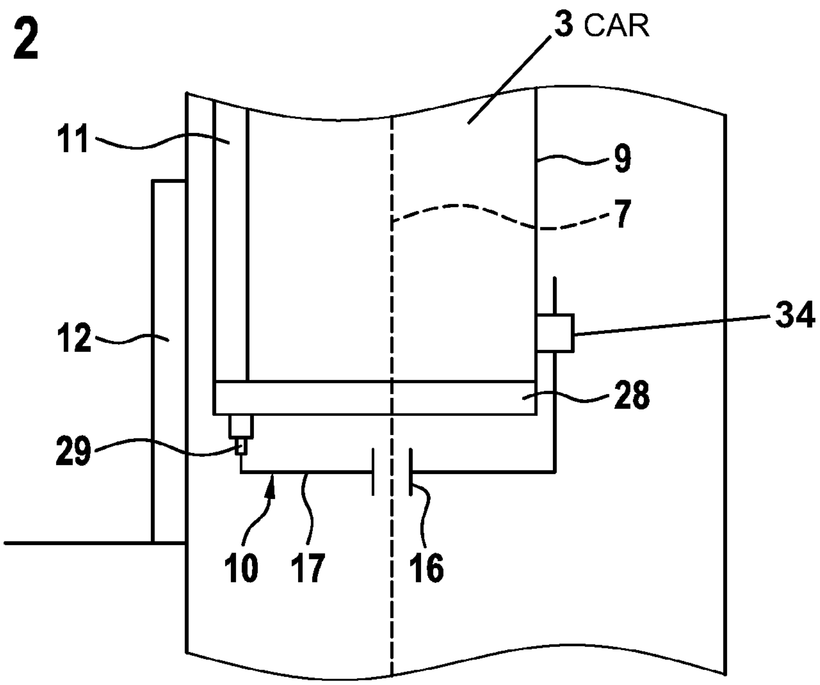
FIG. 2 is an enlarged view of the elevator system according to FIG. 1 with an elevator car stuck between floors, in which the car apron is in a rest position.
Figure 3:
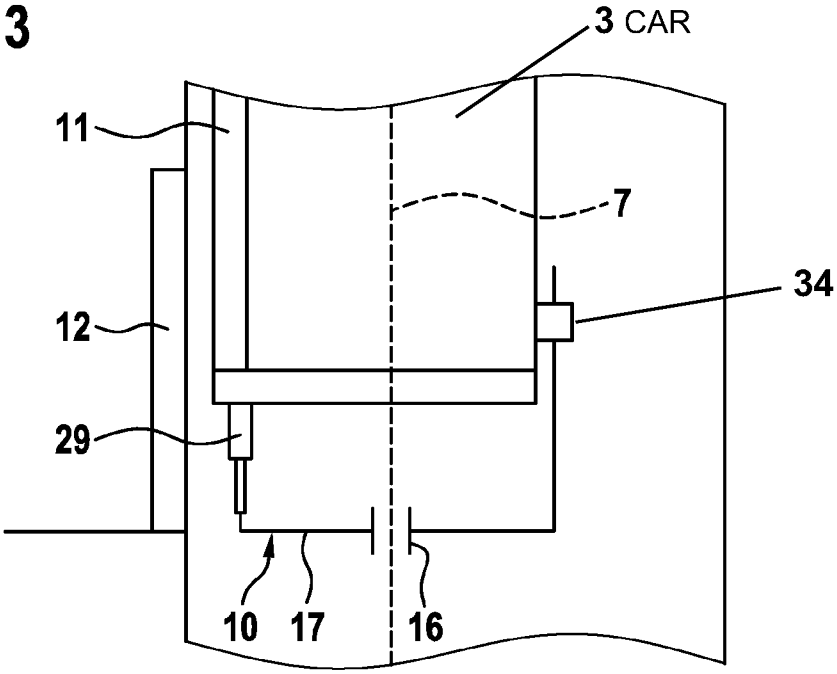
FIG. 3 shows the car with the car apron from FIG. 2, but in a blocking position.

FIG. 2 shows the car 3 in a position between the floors, in which such an emergency evacuation may be necessary. In order for people to be able to safely get out of the car 3 and reach the next floor, the car apron 10 must be transferred from the rest position shown in FIG. 2 to the blocking position. For this purpose, the car apron 10 is moved downward. The car 3 with the car apron 10 moved down into the blocking position is shown in FIG. 3.

It can be seen that the car apron 10 is supported on the guide rails 7 via a support arrangement. This support arrangement is formed by a support structure, the support structure comprising a support frame 17 which is slidably connected to the guide rail 7 via a guide element 16. Each of the guide rails 7 is associated with a guide element 16 for sliding guidance. However, it would also be conceivable for the car apron 10 to be supported on only one side on only one guide rail instead of the two guide elements 16. In the embodiment according to FIGS. 1 to 3, the car apron 10 is designed as a telescopic apron. The apron elements interconnected in a telescopic manner are designated by 29. The vertical length of the car apron 10 when the telescopic apron is fully extended is at least 750 mm. A guide 34 for guiding the car apron 10 at the rear is attached to the rear side 9 of the car. By virtue of the rear guide 34, it can be reliably ensured that the support frame 17 remains in the horizontal position. The support structure which has the support frame 17 and is operatively connected to the guide rails 7 ensures that the telescopic apron or its apron elements 29 hardly yield to a force of 300 N applied at a point and can meet the stability requirements stipulated in European standard EN 81-20:2014, for example.

The fact that the car apron 10 is supported on the guide rails 7 via a support arrangement, as described above, can also be used for other types of movable car aprons and can bring advantages. As can be seen from FIG. 4, for example, design variants of car aprons in which the car aprons are not designed to be movable or rigid are also conceivable. FIG. 4 shows a car apron 10 of this type with a rigid car apron 10 which has a flat apron element 14 which is rigid and is firmly connected to the car 3. The apron element 14 can be made from sheet metal, for example. The car apron 10 is connected to the guide rails 7 for support via a support arrangement 30 with one roller 31 per guide rail 7.

By way of example, FIG. 4 also shows that the guide rails 7 are designed as T-shaped profiles. In the present case, for example, the guide rails 7 are positioned in the elevator shaft in such a way that they lie approximately in the middle of the car sides 13 when viewed from above.

Figure 5:
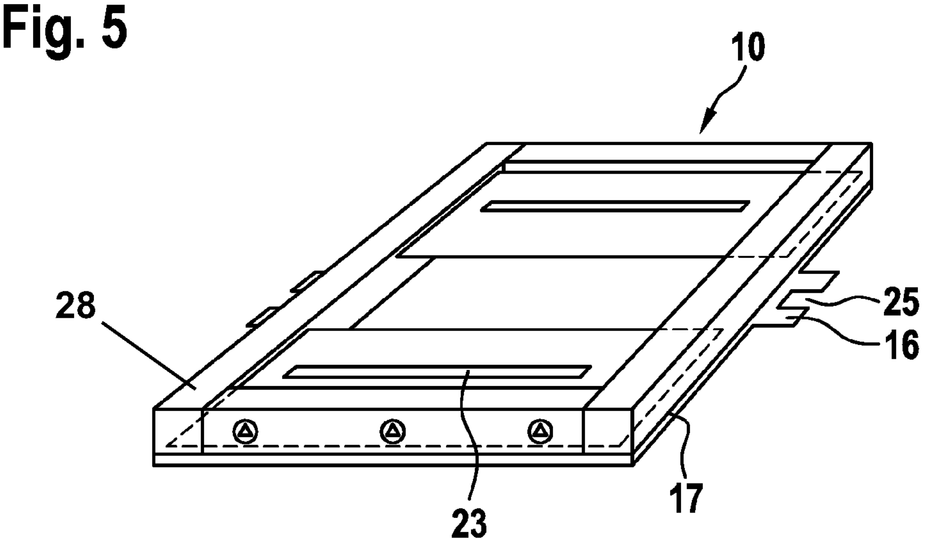
FIG. 5 is a perspective view of a car apron for a further elevator system, in which the car apron is in the rest position.
Figure 6:
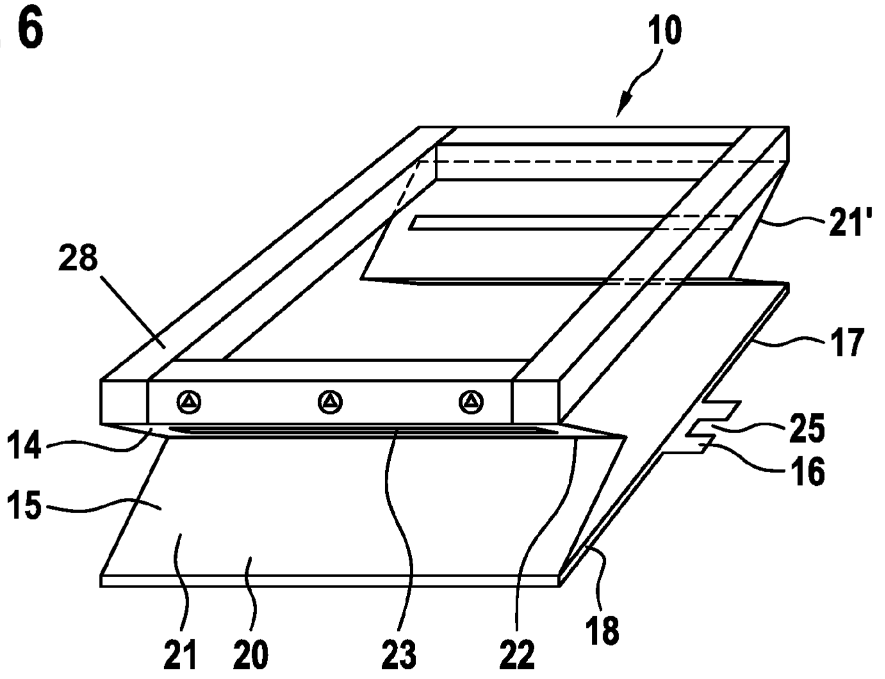
FIG. 6 shows the car apron from FIG. 5 in an intermediate position.
Figure 7:
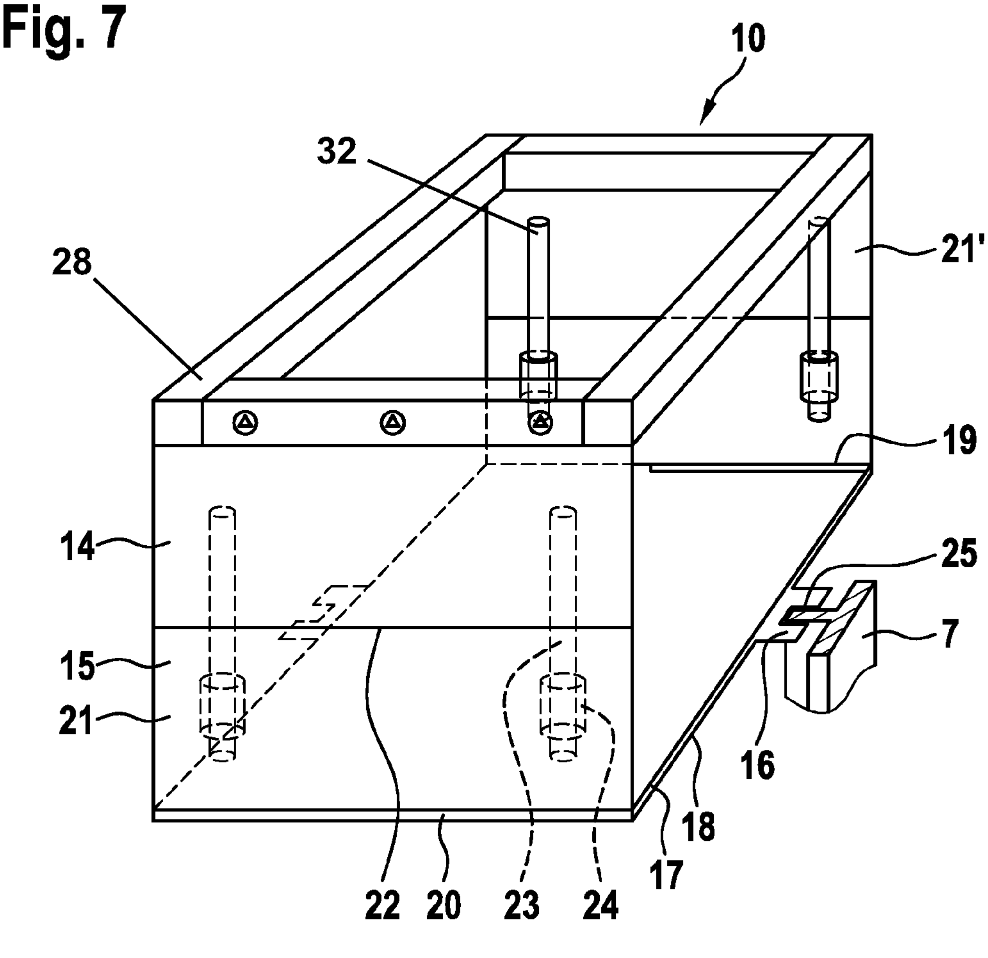
FIG. 7 shows the completely unfolded car apron (blocking position).

FIGS. 5 to 7 relate to a further embodiment of a car apron 10 for a car 3 of an elevator system 1. To form the support structure for supporting the car apron on the guide rails, the car apron 10 has a horizontal support frame 17 with a front frame part 20, a rear frame part 19 and side frame parts 18. The frame parts 18, 19, 20 define a rectangular, closed frame. Furthermore, a carrying frame 28 for carrying the car apron 10 is provided. The carrying frame 28 can be fixed to the underside of the car 3 (not shown here). The carrying frame 28 could also be integrated in the car floor 33, however. Normally, the support frame 17 is held securely on the carrying frame 28 and, as FIG. 5 shows, is connected to the carrying frame 28 with almost no gap. This position corresponds to the rest position associated with normal operation. Securing means for holding the car apron 10 in the rest position can be released if necessary, for example using a triangular key (not shown). After it has been released, the car apron 10 can be moved into the blocking position by gravity. The car apron 10 is shown in the blocking position in FIG. 7. FIG. 6 shows the car apron 10 in an intermediate position between the rest position and the blocking position. FIG. 6 clearly shows that the car apron 10 according to this embodiment is a collapsible car apron.

The foldable car apron 10 has two flat apron elements 14, 15 on each side, which are hinged together via a horizontal fold line 22. The relevant upper apron element 14 is hinged at its upper end about a horizontal pivot axis to the carrying frame 28 and thus to the car 3. The support structure with the support frame 17 adjoins the relevant lower end of the lower apron element 15. The support frame 17 thus forms, to a certain extent, the lower termination of the car apron 10.

The present car apron 10 has partial car aprons which can be folded up on two opposite sides. These partial car aprons are designated by 21 and 21'. The partial car aprons 21, 21' are mechanically coupled to one another via the common support frame 17, which results in simultaneous unfolding. The partial car aprons 21, 21' are associated with the car front side and the opposite car rear side. The car can thus have two car doors. The car apron 10 shown here could also be used for a car having only one car door. Furthermore, it would be conceivable for such cars to dispense with the second partial car apron 21'. As an alternative to this second partial car apron 21', a simple folding mechanism, for example composed of rods or lever elements, could also be used.

The car apron has 10 two mutually opposing guide elements 16 molded on the side frame parts 18. Each guide element 16 is associated with a guide rail 7. The relevant guide element 16 has a cutout 25 which surrounds a web-like guide portion of the associated guide rail 7. FIG. 7 shows that the guide rail 7 is a T-profile. Instead of such conventional car guide rails, however, other rail profiles or guide arrangements are also conceivable. For example, the guide cutout 25 of the guide element 16 could also engage with a web-like guide portion of a guide arrangement in the manner of WO 2016/078726 A1.

Locking means are provided to secure the completely unfolded car apron 10 (FIG. 7). These locking means comprise two pivotable bolt parts 23 on each side or each partial car apron, which engage in associated bolt receiving parts 24 and thus prevent the unfolded car apron 10 from folding in unintentionally. The pivot axes for the bolt parts 23 are denoted by 32. When the car apron 10 is unfolded, the bolt parts 23 are pivoted downward due to the force of gravity and thus come into engagement with the associated bolt receiving parts 24. To return the car apron 10 to the rest position, the bolt parts 23 are pivoted back into the original basic horizontal position. Of course, locking means for securing the completely unfolded car apron which are different from the locking means with the bolt parts and bolt receiving parts, shown here by way of example in FIGS. 5 to 7, would also be conceivable. As an alternative to the pivotable bolt parts described, slidable bolt parts and bolt receiving parts complementary thereto could also be provided. The locking means could also comprise a detent mechanism.

The car apron 10 described above is also suitable for retrofitting or converting existing elevator systems.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system comprising:

a car guided by and movable along car guide rails in an elevator shaft of the elevator system; and a car apron arranged below the car and having a support structure at a bottom end adapted to be laterally supported on the guide rails.

2. The elevator system according to claim 1 wherein the car apron is movable relative to the car.

3. The elevator system according to claim 2 wherein the car apron moves relative to the car by folding or collapsing.

4. The elevator system according to claim 3 wherein the car apron has two flat apron elements hinged together at a horizontal fold line.

5. The elevator system according to claim 4 wherein the car apron includes a locking means actuatable for securing the car apron when the car apron is completely unfolded.

6. The elevator system according to claim 5 wherein the locking means includes a pivotable bolt part that engages in a bolt receiving part when the car apron is completely unfolded.

7. The elevator system according to claim 1 wherein the car apron includes at least one guide element that is guided along an associated one of the guide rails to support the car apron on the guide rails.

8. The elevator system according to claim 7 wherein the at least one guide element has a cutout that surrounds a web-like guide portion of the associated guide rail.

9. The elevator system according to claim 7 wherein the at least one guide element is a part of the support structure that adjoins a lower end of a flat apron element of the car apron.

10. The elevator system according to claim 9 where in the support structure includes a support frame.

11. The elevator system according to claim 1 wherein the car apron includes two mutually opposing guide elements, each of the guide elements being associated with one of the guide rails.

12. The elevator system according to claim 1 wherein the car apron includes foldable or collapsible partial car aprons on a front side of the car and on a rear side of the car opposite the front side, the partial car aprons on the front side of the car being mechanically coupled to the partial car aprons on the rear side of the car.

13. A car apron for a car, the car being guided by and movable along car guide rails of an elevator system, the car apron comprising a support structure adjoined to a bottom end of the car apron, the support structure is guided by and movable along the guide rails when the car apron is arranged below the car.

14. A car apron for a car movable along guide rails in an elevator shaft of the elevator system, the car apron comprising:

two partial car aprons adapted to be arranged below the car and supported on the guide rails;

wherein the partial car aprons move relative to the car by folding or collapsing when arranged below the car;

wherein each of the partial car aprons has two flat apron elements hinged together at a horizontal fold line;

a locking means actuatable for securing the partial car aprons against movement when completely unfolded;

wherein the locking means includes pivotable bolt parts that engages in bolt receiving parts when the partial car aprons are completely unfolded;

at least one guide element that is guided along an associated one of the guide rails to support the car apron on the guide rails;

wherein the at least one guide element has a cutout that surrounds a web-like guide portion of the associated guide rail;

wherein the at least one guide element is a part of a support structure that adjoins a lower end of a flat apron element of each of the partial car aprons;

where in the support structure includes a support frame; and wherein when the car apron is arranged below the car, one of the partial car aprons is located on a front side of the car and another of the partial car aprons is located on a rear side of the car opposite the front side, the partial car aprons being mechanically coupled to one another.

* * * * *